S. M. SCOTT.
CORN PLANTING ATTACHMENT FOR SOD PLOWS.

No. 180,655. Patented Aug. 1, 1876.

WITNESSES:
E. Wolff
John Goethals

INVENTOR:
S. M. Scott
BY
ATTORNEYS.

UNITED STATES PATENT OFFICE.

SANFORD M. SCOTT, OF STOCKBRIDGE, WISCONSIN.

IMPROVEMENT IN CORN-PLANTING ATTACHMENTS FOR SOD-PLOWS.

Specification forming part of Letters Patent No. 180,655, dated August 1, 1876; application filed May 22, 1876.

*To all whom it may concern:*

Figure 1:
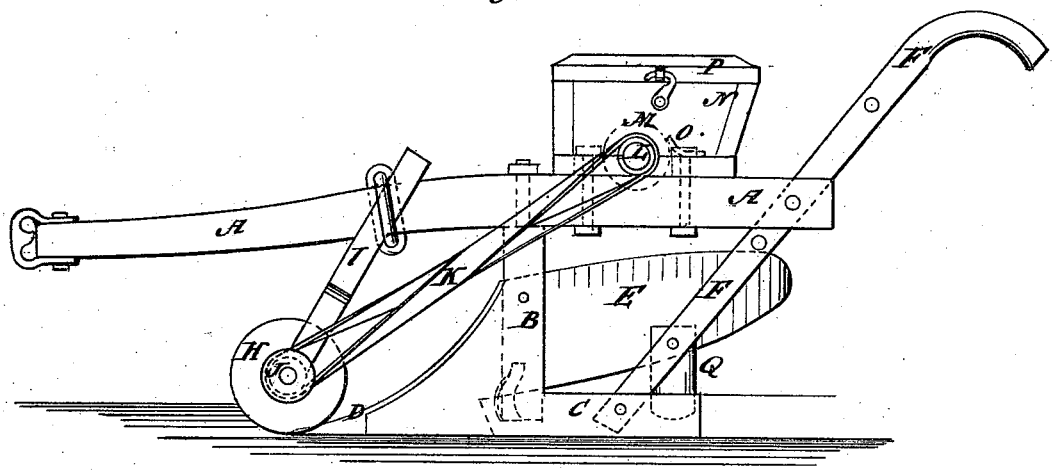
Figure 2:
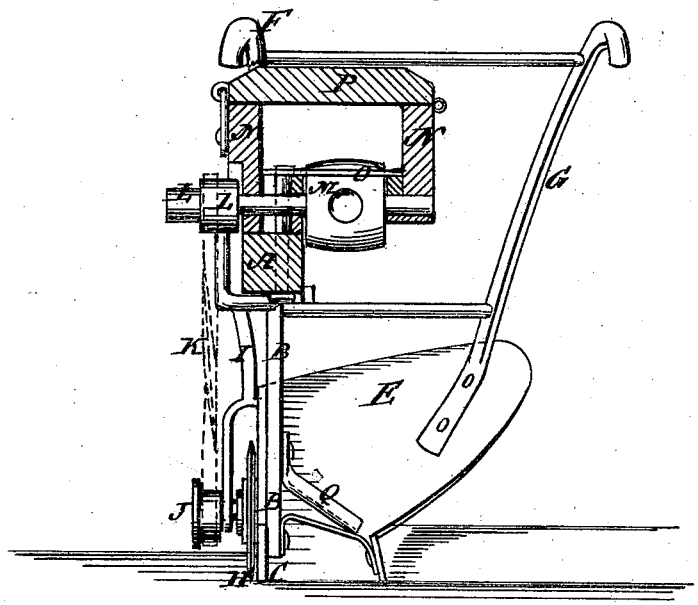

Be it known that I, SANFORD M. SCOTT, of Stockbridge, Calumet county, and State of Wisconsin, have invented a new and Improved Corn-Planting Attachment for Sod-Plows, of which the following is a specification:

In the accompanying drawing, Figure 1 is a side view of my improved plow, and Fig. 2 is a rear view of the same, partly in section, to show the construction.

Similar letters of reference indicate corresponding parts.

The object of my invention is to furnish an improved corn-planting attachment for breaking-up or sod plows, which shall be so constructed as to plant the corn as the sod is turned, and close to the outer edge of the furrow, so that the corn will come up between the sods of two furrows, and which will not be in the way of turning the plow over to file or sharpen the share.

The invention will first be described in connection with drawing, and then pointed out in claim.

In the annexed drawing, A represents the beam; B, the standard; C, the land-side; D, the point; E, the mold-board; F, the land-side handle, and G the mold-board handle, about the construction of which parts there is nothing new. H is a rotary cutter, the standard I of which is clamped or otherwise secured to the beam A. To the journal of the rotary cutter H is attached a pulley, J, around which passes the belt K. The belt K also passes around one or the other of the pulleys L attached to the journals of the dropping-cylinder M. The pulleys L are made of different sizes, so that by placing the belt K upon one or the other of the pulleys L the hills may be dropped wider apart or closer together, as may be desired. The journals of the dropping-cylinder M revolve in bearings in the sides of the seed-box N, and the said cylinder revolves in an opening in the bottom of the said seed-box, and has a hole or recess formed in its side to take the seed from the seed-box and drop it to the ground. The cylinder M is kept from carrying out any more seed than enough to fill its dropping-recess by a strap or other cut-off, O, attached to the bottom of the said seed-box. The seed-box N is screwed to the beam A by bolts that pass through holes in the said beam A and through short slots in the bottom of the said seed-box, so that by loosening the said bolts the seed-box may be adjusted to bring either of the pulleys L in line with the pulley J, as may be desired. The seed-box N is provided with a hinged cover, P, which is secured, when closed, by a hook and eye, or other fastening, so that the corn cannot spill out when the plow is turned over to file its share.

To the land-side handle F is attached a small spout, Q, in such a position as to receive the corn as it drops and guide it to the outer edge of the furrow, so that it can grow up between the sods of two furrows.

Having thus described my invention, what I claim as new, and desire to secure by Letters Patent, is—

The combination, with a sod-plow, of a corn-planter having a spout arranged to drop the seed at the edge of a furrow, as shown and described, whereby the corn is planted, covered, and allowed to come up through the crack between two furrow-slices.

SANFORD M. SCOTT.

Witnesses:
W. P. BROWN,
MOSES WINN.